United States Patent
Shibuya

(10) Patent No.: US 6,618,470 B2
(45) Date of Patent: Sep. 9, 2003

(54) PORTABLE COMMUNICATION TERMINAL PROVIDING EXCITATIVE INDICATION SERVICE FOR INCOMING CALL REACHING IN ABSENCE OF USER'S ATTENTION, METHOD FOR PRODUCING EXCITATIVE INDICATION AND COMPUTER PROGRAM FOR THE METHOD

(75) Inventor: Atsushi Shibuya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/123,368

(22) Filed: Apr. 16, 2002

(65) Prior Publication Data

US 2002/0154750 A1 Oct. 24, 2002

(30) Foreign Application Priority Data

Apr. 20, 2001 (JP) ........................................ 2001-122983

(51) Int. Cl.[7] .............................................. H04M 11/00
(52) U.S. Cl. ................................ 379/93.24; 379/93.17; 455/567
(58) Field of Search ........................... 379/93.24, 93.17, 379/88.02, 93.01, 93.23, 88.11, 90.01; 455/90, 412, 413, 415, 466, 422, 567; 709/206

(56) References Cited

U.S. PATENT DOCUMENTS

2002/0028662 A1 * 3/2002 Yoshinaga .................... 455/90
2002/0094069 A1 * 7/2002 Takahashi et al. ......... 373/93.17
2002/0177471 A1 * 11/2002 Kaaresoja et al. .......... 455/567

FOREIGN PATENT DOCUMENTS

JP          02002281117 A  *  9/2002  .......... H04M/11/00

* cited by examiner

Primary Examiner—Melur Ramakrishnaiah
(74) Attorney, Agent, or Firm—Michael Best & Friedrich LLC

(57) ABSTRACT

A portable communication terminal has an active call-up device for a user who tends to leave it, frequently; when an in-coming call/mail reaches the portable communication terminal in the absence of the user, a data processor periodically activates the active call-up device so that the active call-up device gives rise to excitative indication such as vibrations, flicker and/or rumble; the excitative indication forces the user to pay the attention to the incoming call/mail not responded yet so that the user immediately responds to the call/mail after returning to the portable communication terminal.

22 Claims, 6 Drawing Sheets

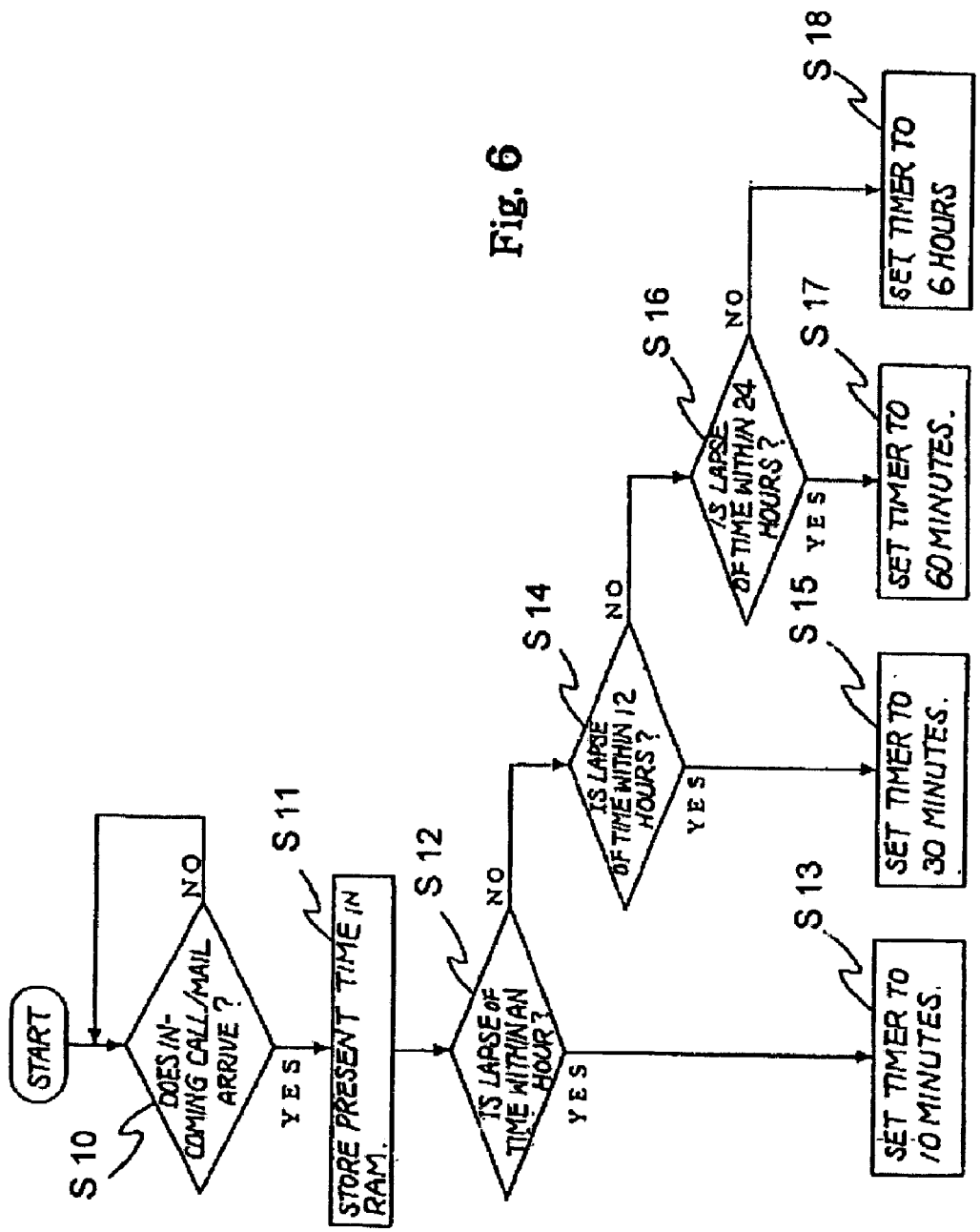

PORTABLE COMMUNICATION TERMINAL PROVIDING EXCITATIVE INDICATION SERVICE FOR INCOMING CALL REACHING IN ABSENCE OF USER'S ATTENTION, METHOD FOR PRODUCING EXCITATIVE INDICATION AND COMPUTER PROGRAM FOR THE METHOD

FIELD OF THE INVENTION

This invention relates to a portable communication terminal and, more particularly, to a portable communication terminal providing an excitative indication service for an incoming call or mail in the absence of user's attention, a method for producing excitative indication and a computer program for the method.

DESCRIPTION OF THE RELATED ART

Growing research and development efforts are being made for high-performance portable communication terminals such as mobile communication computers with an emphasis put on services as portable digital assistants. The portable communication terminals are usually carried by the users so as to permit the user immediately to communicate with others.

When a call signal reaches a portable communication terminal, the portable communication terminal notifies the user of the call, and the user takes the portable communication terminal in his or her hands for receiving a message such as an e-mail. Then, a radio channel is established between the portable communication terminal and the calling subscriber or a provider, and the user receives the message.

However, the user sometimes leaves the portable communication terminal inactive, or is within a prohibited area where users have to refrain from communication through the portable communication terminal. In this situation, the prior art portable communication terminal tries to notify the user of the incoming call or a message left in the information service facility through an image or words produced on the display unit thereof However, the display unit is passive. The image or words are produced on the display unit only when a program runs on the prior art portable communication terminal. In other words, if the user leaves the prior art portable communication terminal inactive, the prior art portable communication terminal does not inform the user of the incoming call or the message. The message may be urgent. If the urgent message reaches the user too late, the prior art portable communication terminal disappoints the user.

SUMMARY OF THE INVENTION

It is therefore an important object of the present invention to provide a portable communication terminal, which forces user to pay the attention to an incoming call/e-mail not responded by the user.

It is also an important object of the present invention to provide a method for producing an excitative indication so as to force the user to pay the attention to the portable communication terminal.

It is also an important object of the present invention to provide a computer program for the method.

To accomplish the objects, the present invention proposes to give excitative indication to user so as to force his or her attention to a portable communication terminal.

In accordance with one aspect of the present invention, there is provided a portable communication terminal forming a part of a communication network, comprising a transmitter-receiver receiving an in-coming signal and transmitting an out-going signal through a communication channel of the communication network, an active call-up device responsive to a first instruction for producing an excitative indication and giving the excitative indication to an environment so as to force a user, if any, to pay an attention thereto, an interface to the user for at least accepting a response to the in-coming signal, an information processing system connected to the transmitter-receiver, the active call-up device and the interface and producing the first instruction when the communication channel is broken before the user gives the response through the interface.

In accordance with another aspect of the present invention, there is provided a method for outputting an excitative indication from a portable communication terminal, and the method comprises the steps of (a) receiving an in-coming signal relating at least one of a call and an e-mail, (b) determining whether or not a user has responded to the in-coming signal, (c) checking a lapse of time from the reception of the in-coming signal to see whether or not the lapse of time reaches a value when the answer at step (b) is given negative, (d) generating the excitative indication so as to force the user, if any, to pay an attention to the at least one of the call and the e-mail when the answer at step (c) is given affirmative and (e) repeating the steps (b), (c) and (d) until the answer at step (b) is changed affirmative.

In accordance with yet another aspect of the present invention, there is provided a computer program for realizing a method of outputting an excitative indication from a portable communication terminal, and the method comprises the steps of (a) receiving an in-coming signal relating at least one of a call and an e-mail, (b) determining whether or not a user has responded to the in-coming signal, (c) checking a lapse of time from the reception of the in-coming signal to see whether or not the lapse of time reaches a value when the answer at step (b) is given negative, (d) generating the excitative indication so as to force the user, if any, to pay an attention to the at least one of the call and the e-mail when the answer at step (c) is given affirmative and (e) repeating the steps (b), (c) and (d) until the answer at step (b) is changed affirmative.

BRIEF DESCRIPTION OF THE DRAWINGS

The features and advantages of the portable communication terminal, the method and the program will be more clearly understood from the following description taken in conjunction with the accompanying drawings, in which FIG. 6 is a flowchart showing a computer program for another method of producing excitative indication.

DESCRIPTION OF THE PREFERRED EMBODIMENTS

First Embodiment

Structure of Portable Communication Terminal

Figure 1:
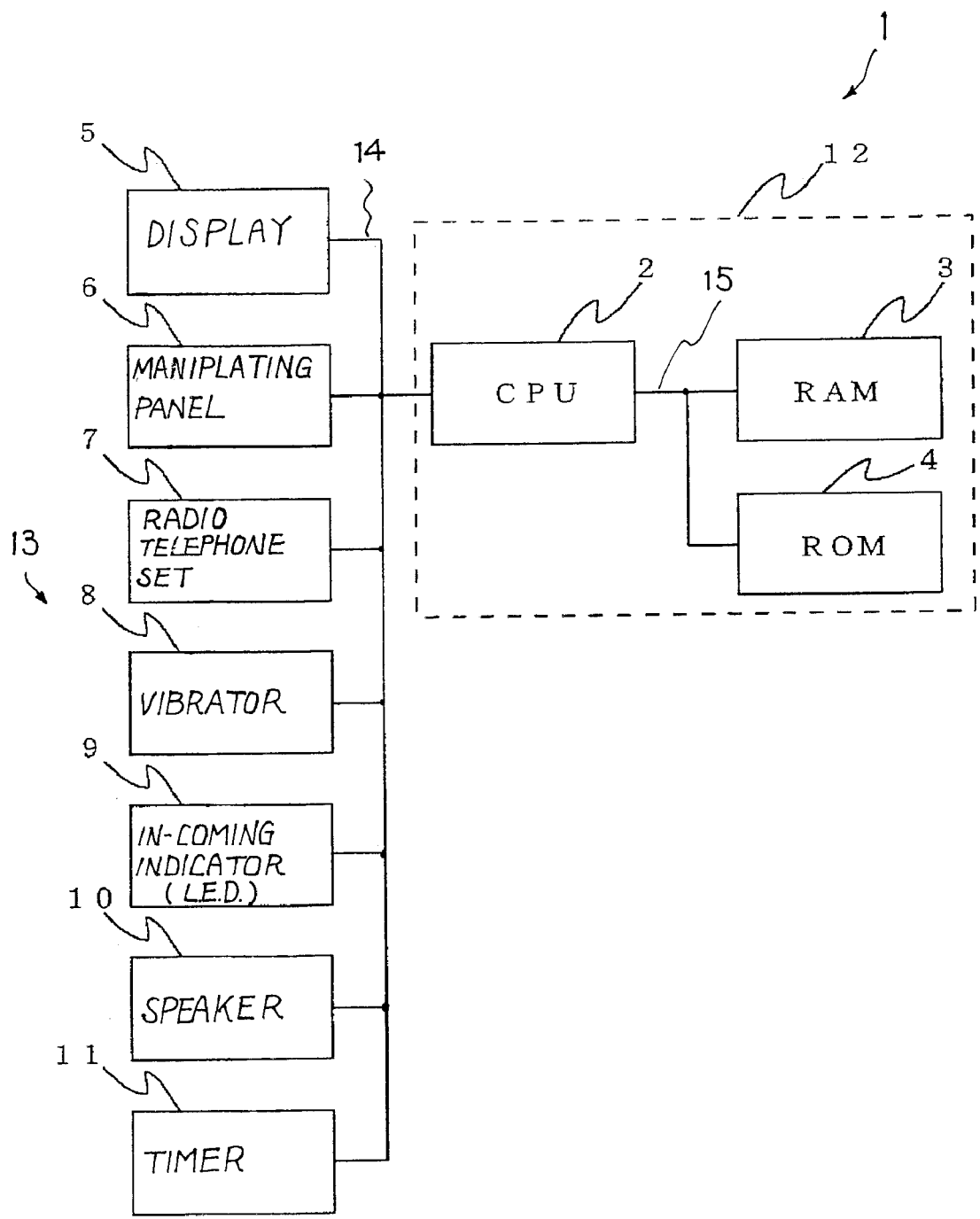
FIG. 1 is a block diagram showing the arrangement of a portable communication terminal according to the present invention.

Referring first to FIG. 1 of the drawings, a portable communication terminal embodying the present invention is designated by reference numeral 1. The portable communication terminal 1 offers a speech communication and an e-mail communication to users. The portable communication terminal 1 comprises a controlling unit 12, a display 5, a manipulation panel 6, a radio telephone set 7, a timer 11 and an active call-up device 13. The controlling unit 12 is connected through a bus system 14 to the other components, i.e., the display 5, manipulation panel 6, radio telephone set 7, timer 11 and active call-up device 13. The controlling unit 12 accepts user's requests through the manipulating panel 6, and gives instructions to the other components 5/7/11/13 for producing visual images, establishing a communication channel and arousing user's attention. Though not shown in the figure, a power source is incorporated in the portable communication terminal 1, and supplies electric power to the controlling unit 12, display 5, manipulating panel 6, radio telephone set 7, active call-up device 13 and timer 11. The timer 11 may be a software timer.

The controlling unit 12 includes a central processing unit 2, a random access memory 3 and a read only memory 4, and the central processing unit 2 is connected through an internal bus system 15 to the random access memory 3 and the read only memory 4. Computer programs are stored in the read only memory 4, and selectively runs on the central processing unit 2 under the control of a suitable operating system. The computer programs offer various tools such as, for example, an image-producing tool, an e-mail transmitting/receiving tool, an internet connecting tool, a speech communication tool and a controlling tool for the active call-up device 13 to the user. The controlling tool or program will be described hereinafter in detail.

The random access memory 3 offers a temporary data storage to the central processing unit 2. Pieces of control data such as, for example, status flags are stored in the random access memory 3, and the central processing unit 2 selectively raises and falls the status flags during the execution of the programs. Pieces of personal information such as a personal telephone directory are further stored in the random access memory 3, and messages received and to be transmitted are also stored in the random access memory 3. If an e-mail or in-coming call arrives at the portable communication terminal 1 in the absence of the user, the e-mail message and a piece of information representative of the reception of the in-coming call are stored in the random access memory 3.

The display 5 is implemented by a monochrome liquid crystal display panel or a full-color liquid crystal display panel. When the central processing unit 2 makes the display panel 5 to produce visual images, the central processing unit 2 gives the instruction to the display 5, and supplies pieces of data information representative of the visual images to the display 5. Then, the monochrome/full-color liquid crystal display panel 5 produces the visual images on the image-producing plane 5a thereof (see FIG. 2).

The manipulating panel 6 has an array of key switches (see FIG. 2), and the central processing unit 2 periodically checks the manipulating panel 6 to see whether or not the user manipulates any one of the key switches. When the user manipulates the key switch or switches, the central processing unit 2 specifies the key switch or switches manipulated by the user, and interprets user's instructions or requests so as to branch the control to a suitable computer program.

Figure 2:
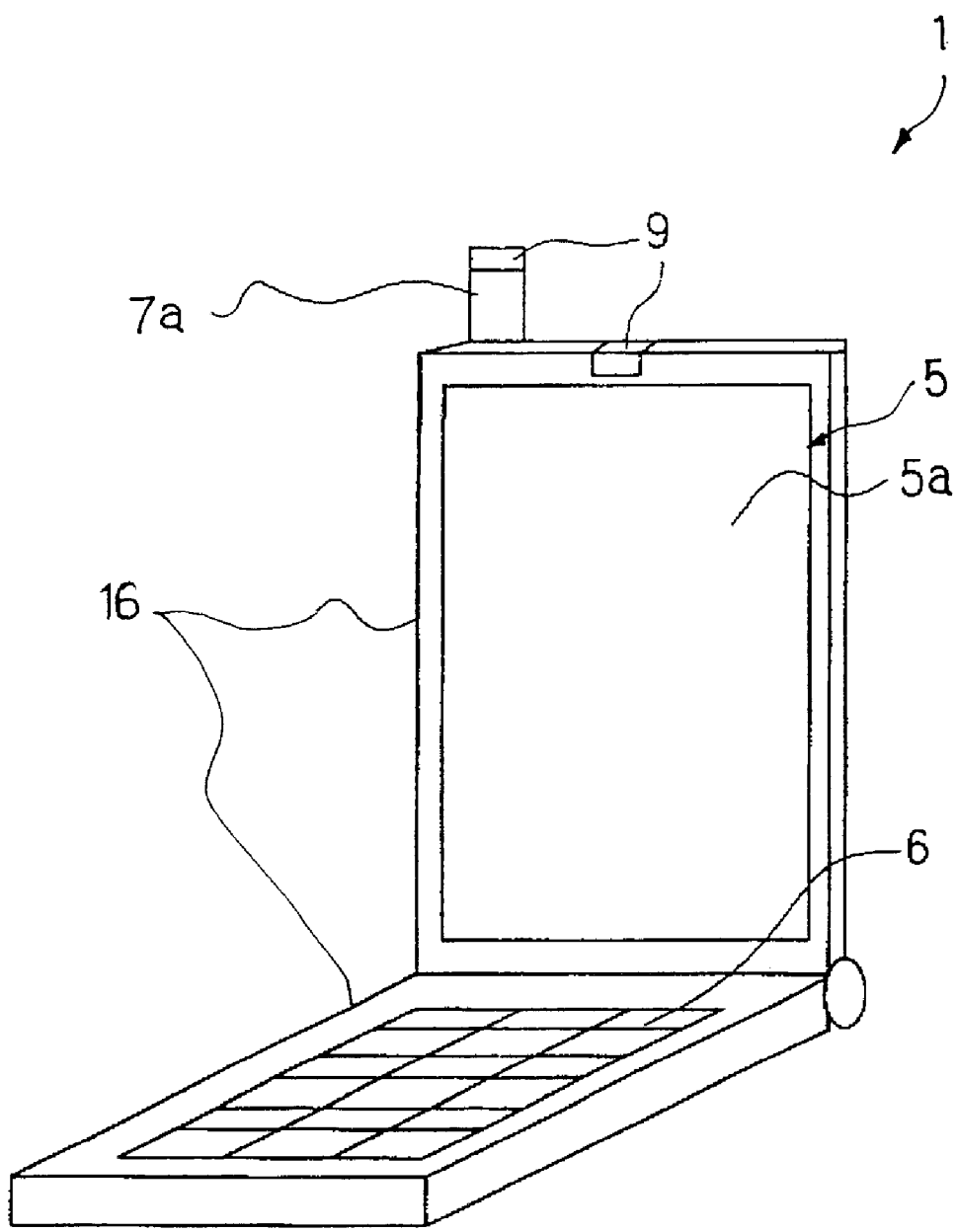
FIG. 2 is a perspective view showing the external appearance of the portable communication terminal.

The radio telephone set 7 includes a transmitter, a receiver and an antenna 7a (see FIG. 2). When the user requests the central processing unit 2 through the manipulation panel 6 for the speech communication, the central processing unit 2 cooperates with the radio telephone set 7 for the speech communication, and the signals are received at and transmitted from the antenna 7a to a base station through a radio channel assigned thereto.

The radio telephone set 7 is used in the e-mail communication. When the user requests the central processing unit 2 to send an e-mail, the central processing unit 2 assists the user in writing a message, and instructs the radio telephone set 7 to send the message through the base station to the address assigned to the destination. Then, a communication channel is established between the radio telephone set 7 and the destination, and the radio telephone set 7 sends the message thereto. On the other hand, when an e-mail reaches the radio telephone set 7 through the antenna 7a, the central processing unit 2 extracts a message from the in-coming signal, and stores the message in the random access memory 3.

The timer 11 serves as a clock, and reports the present time to the central processing unit 2. The central processing unit 2 may instruct the display 5 to produce a visual image representing the present time on the image-producing plane 5a. The timer 11 further clocks a lapse of time for an in-coming call without a response to the call and a non-acknowledged e-mail. When a subscriber, who wants to communication with the user through the portable communication terminal 1, breaks the communication channel before responding the call, the timer 11 starts the clocking, and reports the expiry of a predetermined time to the central processing unit 2.

The active call-up device 13 includes a vibrator 8, an in-coming indicator 9 and a speaker 10. The vibrator 8 is either enabled or disabled with an instruction supplied from the central processing unit 2. In detail, when the user requests the central processing unit 2 to enable or disable the vibrator 8 through the manipulation panel 6, the central processing unit 2 supplies an instruction signal representative of the active state or inactive state to the vibrator 8. The vibrator 8 is responsive to the instruction signal so as to be enabled or disabled. When the vibrator 8 is disabled with the instruction signal, the vibrator 8 does not respond to an in-coming call nor in-coming e-mail, and keeps itself silent until reception of the opposite instruction. On the other hand, when the vibrator 8 is enabled with the instruction signal, the vibrator 8 becomes responsive to the in-coming call and in-coming e-mail. An incoming call is assumed to reach the portable communication terminal 1 after changing the vibrator 8 to the active state. The vibrator 8 gives rise to vibrations, and notifies the user of the in-coming call.

The in-coming indicator 9 includes a set of light emitting diodes embedded in the antenna 7a and the frame of the display 5 (see FIG. 2). The set of light emitting diodes radiates light in different colors so as to notify the in-coming call and in-coming e-mail. In other words, when an in-coming call reaches the radio telephone set 7, the central processing unit 2 instructs the in-coming indicator 9 to radiate the light in a certain color. On the other hand, when an in-coming e-mail reaches the radio telephone set 7, the central processing unit instructs the in-coming indicator 9 to radiate the light in another color. Thus, the user is notified of the arrival or call or e-mail depending upon the color. The in-coming indicator 9 may flicker the light at different intervals between the arrival of call and the arrival of e-mail.

The speaker 10 is also changed between the active state and the inactive state depending upon the user's request. The user is assumed to request the central processing unit 2 to enable or disable the speaker 10 through the manipulation panel 6, then the central processing unit 2 supplies an instruction signal representative of the active state or inactive state to the speaker 10. The speaker 10 is responsive to the instruction signal so as to be enabled or disabled. When the speaker 10 is disabled with the instruction signal, the speaker 10 does not respond to an in-coming call nor in-coming e-mail, and keeps itself silent until reception of the opposite instruction. On the other hand, when the speaker 10 is enabled with the instruction signal, the speaker 10 becomes responsive to the in-coming call and in-coming e-mail. An in-coming call is assumed to reach the portable communication terminal 1 after changing the speaker 10 to the active state. The speaker 10 gives rise to rumble, and notifies the user of the in-coming call.

External Appearance

The portable communication terminal 1 thus constituted has external appearance shown in FIG. 2. The controlling unit 12, display 5, manipulating panel 6, radio telephone set 7, vibrator 8, speaker 10 and timer 11 are accommodated in a foldable case 16. A part of the foldable case 16 to be placed on a desk or the like is a base portion, and the manipulating panel 6 is exposed to the upper surface of the base portion. The other portion is hinged to the base portion, and the image-forming plane 5a is exposed to the inner surface of the other portion. The antenna 7a projects from the end surface of the other portion, and may be retractable into the other portion. The light-emitting diodes of the in-coming indicator 9 are embedded in the antenna 7a and the end portion of the other portion.

When the user stretches the other portion, the image-forming plane 5a rises, and is opposed to the user. On the other hand, when the user folds the other portion over the base portion, the portable communication terminal 1 becomes compact, and the user feels the portable communication terminal 1 easy to carry.

Communication Network

Figure 3:
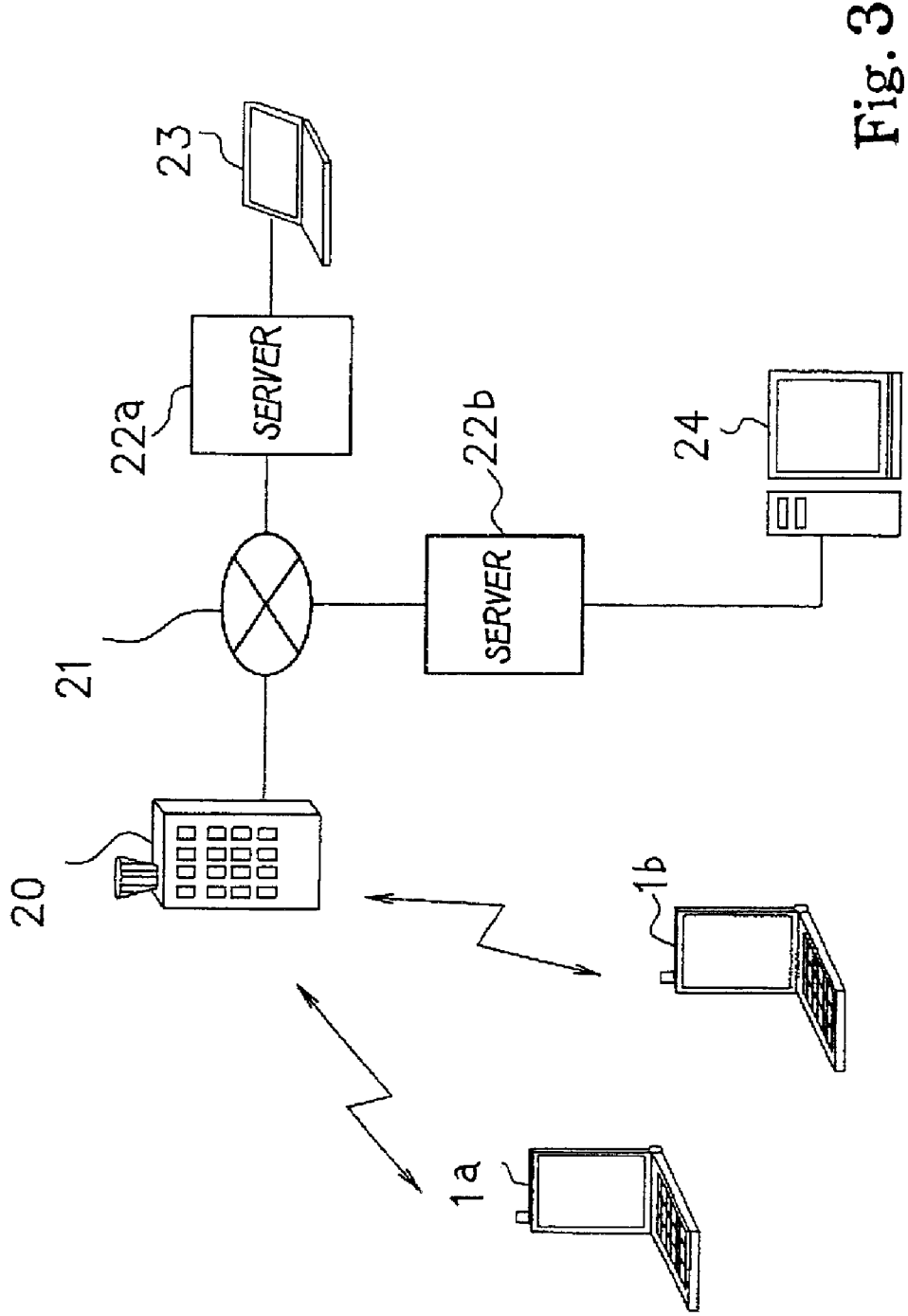
FIG. 3 is a schematic view showing a communication network.

Turning to FIG. 3 of the drawings, the portable communication terminals 1a/1b form parts of a communication network together with a mobile terminal 23 and a personal computer 24. The portable communication terminals 1a/1b are communicable with a base station 20 through radio channels, and the base station 20 is connected through the internet 21 to severs 22a/22b of plural providers. The base station 20 has a server, and e-mails are accumulated in and distributed from the server installed in the base station 20. Similarly, each of the servers 22a/22b accumulates e-mails therein and distributes the e-mails to the other servers. The portable communication terminals 1a/1b are identical with the above-described portable communication terminal 1, and transmit e-mails to and receive e-mails from the mobile terminal 23, personal computer 24 and another portable communication terminal.

The mobile terminal 23 is equipped with an internet connecting tool and an e-mail transmitting/receiving tool, and is connectable to the server 22a through a public cable. Thus, the mobile terminal 23 transmits an e-mail to and receives an e-mail from the personal computer 24 and the portable communication terminals 1a/1b through the server 22a.

Similarly, the personal computer 24 is equipped with an internet connecting tool and an e-mail transmitting/receiving tool, and is connected to the server 22b of another provider through a cable. The personal computer 24 also transmits an e-mail to and received an e-mail from the mobile terminal 23 and the portable communication terminals 1a/1b.

The portable communication terminals 1a/1b are respectively equipped with the active call-up devices 13. The base station 20 is assumed to be requested to establish a radio communication channel to the portable communication terminal 1a. The base station 20 supplies an in-coming call or a request for receiving an e-mail to the portable communication terminal through the radio channel. When the user responds to the in-coming call or the request, the base station 20 keeps the radio communication channel to the portable communication terminal 1a, and supplies voice messages or the e-mail to the portable communication terminal 1a.

However, if the user does not respond, the base station 20 breaks the radio communication channel, and releases it. The radio telephone set 7 notifies the central processing unit 2 of the breakage of the radio communication channel, and the central processing unit 2 checks a status flag to see whether or not the communication channel was broken without any respond to the in-coming call or request. If the answer is given affirmative, the central processing unit 2 activates the active call-up device 13 after expiry of a predetermined time period. The active call-up device 13 gives rise to at least one of the vibrations, rumble and flicker so as to force the user to pay the attention thereto. Thus, the active call-up device 13 causes the user to check the random access memory 3 for a message immediately after returning to the portable communication terminal 1a. The central processing unit 2 repeats the activation of the active call-up device 13. When the user acknowledges the active call-up, the central processing unit 2 releases the active call-up device from the job. The user calls back the subscriber, or opens the e-mail so as to read the message.

The active call-up device 13 may selectively give the vibrations, rumble and flicker to the user depending upon the sort of message, i.e., in-coming call or e-mail.

Active Call-Up

Description is hereinbelow made on the behavior of the portable communication terminal 1a at reception of an in-coming call or a request for receiving an e-mail in the absence of the user with reference to FIGS. 4 and 5.

Figure 4:
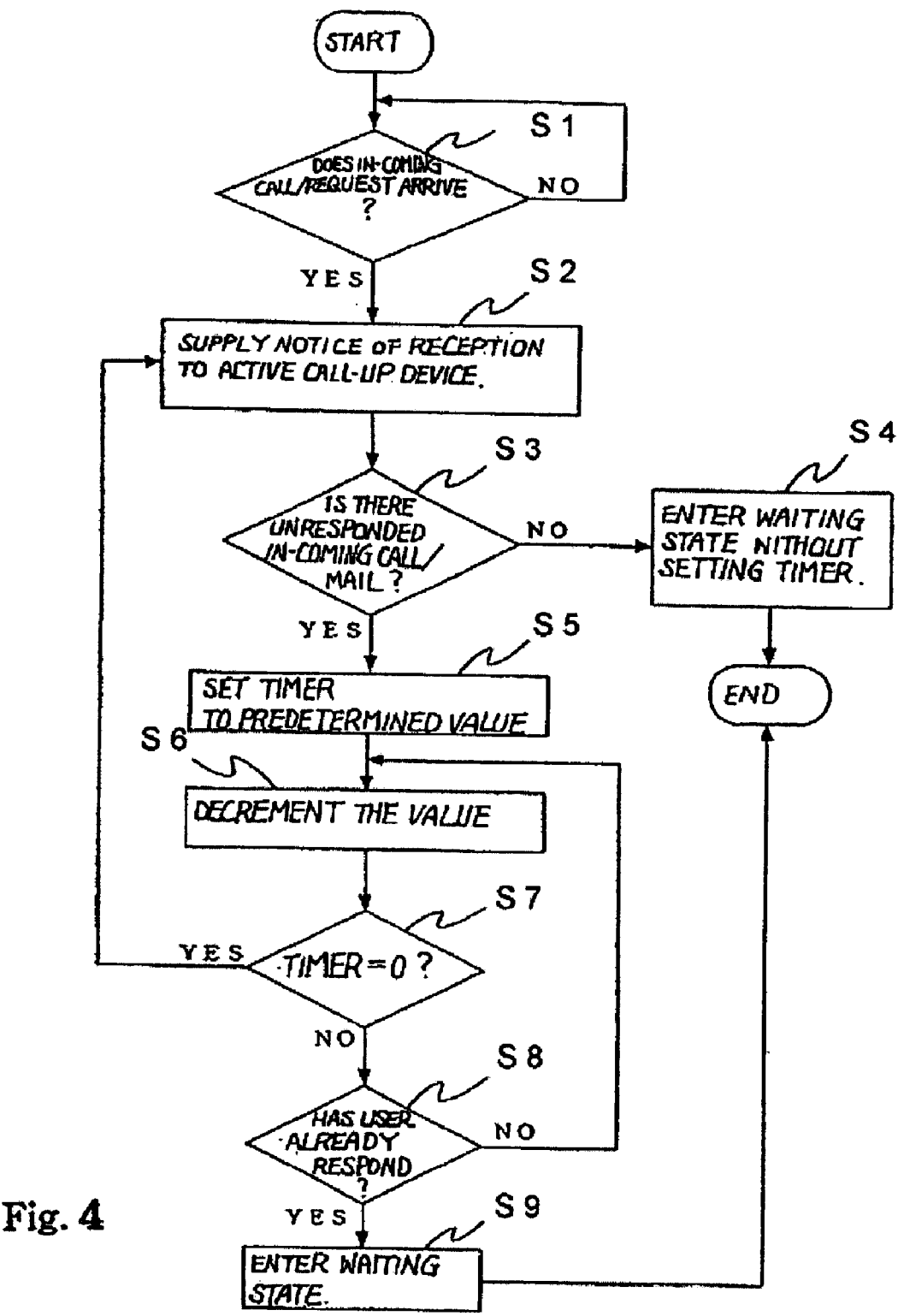
FIG. 4 is a flowchart showing a computer program for a method of producing excitative indication.
Figure 5:
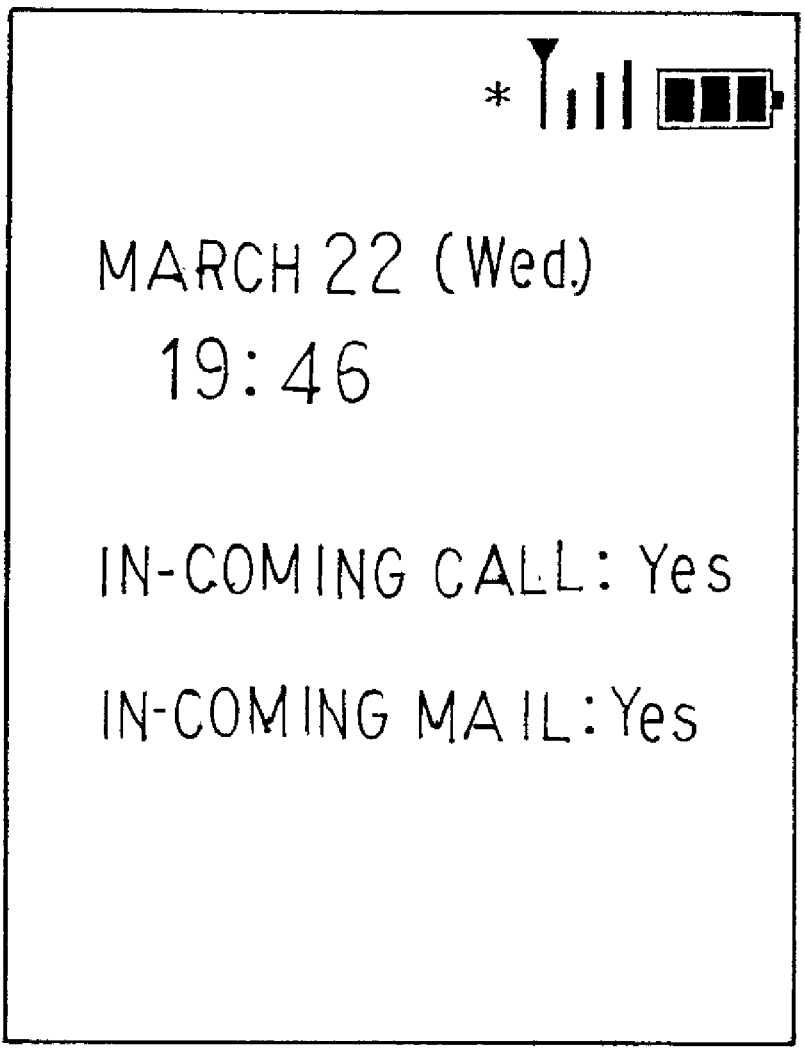
FIG. 5 is a front view showing messages producing on a display in the absence of user.

When the portable communication terminal 1a is powered, the central processing unit 2 starts a control sequence shown in FIG. 4. The central processing unit 2 periodically checks a flag to see whether or not the in-coming call/request arrives at the radio telephone set 7 as by step S1. While any in-coming call/request has not been reached, the answer at step S1 is given negative, and the central processing unit 2 continues periodically to check the flag for the in-coming call/request.

The base-station 20 is assumed to send an in-coming call/request to the portable communication terminal 1a. The radio telephone set 7 notifies the central processing unit 2 of the reception of the in-coming call/request, and the central processing unit 2 raises the flag in the random access memory 3. Then, the answer at step S1 is changed to the positive answer, and the central processing unit 2 supplies an instruction for the notice of reception to the active call-up device 13 as by step S2. The active call-up device responds to the instruction, and gives rise to the excitative indication, i.e., at least one of the vibrations, flicker and rumble by means of the vibrator 8, in-coming indicator 9 and/or speaker 10.

The user can not respond to the excitative indication, because he or she is absent. Then, the central processing unit 2 raises a flag, and stores a message in the random access memory 3. The central processing unit 2 gives an instruction for producing the message to the display 5. The display 5 respond to the instruction, and produces the visual images of the message on the image-producing plane 5a as shown in FIG. 5. The in-coming call/request to which the user have not responded is hereinbelow referred to as "unresponded in-coming call/mail".

The central processing unit 2 periodically checks the random access memory to see whether or not an unresponded in-coming call/mail is left as by step S3. If the answer at step S3 is given negative, the central processing unit 2 permits the portable communication terminal 1a to enter waiting state without setting the timer 11 as by step S4.

The central processing unit 2 has raised the flat representative of the unresponded in-coming call/mail so that the answer at step S3 is given affirmative. The central processing unit 2 proceeds to step S5, and sets the timer 11 to a predetermined value. The timer 11 decrements the predetermined value as by step S6, and the central processing unit 2 checks the timer 11 to see whether or not the predetermined value has been decremented to zero as by step S7. While the timer 11 is keeping the value greater than zero, the answer at step S7 is given negative, and the central processing unit 2 checks the flag to see whether or not the user has already respond to the in-coming call/mail as by step S8. If the answer at step S8 is given affirmative, the central processing unit 2 permit the portable communication terminal 1a to enter the waiting state as by step S9. However, if the user has not responded, yet, the answer at step S8 is given negative, and the central processing unit 2 returns to step S6 so as to decrement the predetermined value. Thus, the central processing unit 2 reiterates the loop consisting of steps S6, S7 and S8 until the timer 11 reaches zero.

When the timer 11 reaches zero, the answer at step S7 is given affirmative, and the central processing unit returns to S2, and gives the instruction for the active call-up to the active call-up device 13. The active call-up device 13 gives rise to the excitative indication, i.e., at least one of the vibrations, flicker and rumble. The central processing unit 2 reiterates the loop consisting of steps S2 to S9 until the answer at step S3 is given negative or answer at step S8 is given affirmative. Thus, the central processing unit 2 periodically activates the active call-up device 13 so as to force the user to pay the attention to the message produced on the display 5.

As will be understood from the foregoing description, the portable communication terminal 1 according to the present invention periodically activates the active call-up device 13 so that the user is forced to pay the attention to the message on the display 5 immediately after returning to the portable communication terminal 1. Thus, it is rare that the messages reach the user too late.

In the above-described embodiment, the radio telephone set 7 is corresponding to a transmitter-receiver. The display 5 and manipulating panel 6 as a whole constitute an interface to user, and the controlling unit 12, timer 11 and computer programs form in combination an information processing system.

Second Embodiment

A portable communication terminal implementing the second invention is identical in hardware with the portable communication terminal 1, and no further description is incorporated hereinbelow. However, the components of the portable communication terminal are labeled with references designating corresponding components of the portable communication terminal 1 in the following description. The computer program for controlling the active call-up device 13 is similar to that shown in FIG. 4 except steps S1 and S5. For this reason, the behavior of the portable communication terminal implementing the second embodiment is described with concurrent reference to FIGS. 4 and 6.

When the portable communication terminal is powered, the central processing unit 2 starts a control sequence as similar to the portable communication terminal 1. The central processing unit 2 periodically checks the flag to see whether or not the in-coming call/mail arrives at the radio telephone set 7 as by step S10 (see FIG. 6). While any in-coming call/mail has not been reached, the answer at step S10 is given negative, and the central processing unit 2 continues periodically to check the flag for the in-coming call/mail.

The base-station 20 is assumed to send an in-coming call/mail to the portable communication terminal. The radio telephone set 7 notifies the central processing unit 2 of the reception of the in-coming call/mail, and the central processing unit 2 raises the flag in the random access memory 3. Then, the answer at step S10 is changed to the positive answer, and the central processing unit 2 proceeds to step S11. The central processing unit 2 checks the timer 11 for the present time at which the in-coming call/mail reaches the radio telephone set 7, and stores the present time in the random access memory 3. Thus, step S1 is replaced with steps 10 and 11 in the computer program for the second embodiment.

Subsequently, the central processing unit 2 supplies an instruction for the notice of reception to the active call-up device 13 as by step S2 (see FIG. 4). The active call-up device 13 responds to the instruction, and gives rise to the excitative indication, i.e., at least one of the vibrations, flicker and rumble by means of the vibrator 8, in-coming indicator 9 and/or speaker 10.

The user can not respond to the excitative indication, because he or she is absent. Then, the central processing unit 2 raises a flag, and stores a message in the random access memory 3. The central processing unit 2 gives an instruction for producing the message to the display 5. The display 5 respond to the instruction, and produces the visual images of the message on the image-producing plane 5a as shown in FIG. 5.

The central processing unit 2 periodically checks the random access memory 3 to see whether or not an unresponded in-coming call/mail is left in the random access memory 3 as by step S3. If the answer at step S3 is given negative, the central processing unit 2 permits the portable communication terminal 1a to enter waiting state without setting the timer 11 as by step S4.

The central processing unit 2 has raised the flat representative of the unresponded in-coming call/mail so that the answer at step S3 is given affirmative. The central processing unit 2 proceeds to step S12 (see FIG. 6). The central processing unit 2 calculates the lapse of time from the arrival of the unresponded in-coming call/mail, and seeks the answer to the question whether or not the lapse of time is within an hour. When the lapse of time is shorter than an hour, the answer at step S12 is given affirmative, and the central processing unit 2 sets the timer to ten minutes as by step S13.

The timer 11 decrements the value as by step S6 (see FIG. 4), and the central processing unit 2 checks the timer 11 to see whether or not ten minutes are expired as by step S7. While the timer 11 is keeping the value greater than zero, the answer at step S7 is given negative, and the central processing unit 2 checks the flag to see whether or not the user has already respond to the in-coming call/mail as by step S8. If the answer at step S8 is given affirmative, the central processing unit 2 permit the portable communication terminal 1a to enter the waiting state as by step S9. However, if the user has not responded, yet, the answer at step S8 is given negative, and the central processing unit 2 returns to step S6 so as to decrement the predetermined value. Thus, the central processing unit 2 reiterates the loop consisting of steps S6, S7 and S8 until the timer 11 reaches zero.

When the timer 11 reaches zero, the answer at step S7 is given affirmative, and the central processing unit returns to S2, and gives the instruction for the active call-up to the active call-up device 13. The active call-up device 13 gives rise to the excitative indication, i.e., at least one of the vibrations, flicker and rumble. The central processing unit 2 reiterates the loop consisting of steps S2, S3, S12, S13 and S6 to S9 until the answer at step S3 is given negative or answer at step S8 is given affirmative. Thus, the central processing unit 2 activates the active call-up device 13 at intervals of ten minutes until the lapse of time reaches an hour.

If the user has not come back to the portable communication terminal, the lapse of time exceeds an hour. Then, the answer at step S12 is given negative, and the central processing unit 2 seeks the answer to the question whether or not the lapse of time is within 12 hours as by step S14. When the lapse of time is shorter than 12 hours, the answer at step S14 is given affirmative, and the central processing unit 2 sets the timer to 30 minutes as by step S15. The central processing unit 2 reiterates the loop consisting of steps S2, S3, S12, S14, S15 and S6 to S9 until the answer at step S3 is given negative or answer at step S8 is given affirmative. Thus, the central processing unit 2 activates the active call-up device 13 at intervals of 30 minutes until the lapse of time reaches 12 hours.

If the user has not come back to the portable communication terminal, yet, the lapse of time exceeds 12 hours. Then, the answers at steps S12 and S14 are given negative, and the central processing unit 2 seeks the answer to the question whether or not the lapse of time is within 24 hours as by step S16. When the lapse of time is shorter than 24 hours, the answer at step S16 is given affirmative, and the central processing unit 2 sets the timer to 60 minutes as by step S17. The central processing unit 2 reiterates the loop consisting of steps S2, S3, S12, S14, S16, S17 and S6 to S9 until the answer at step S3 is given negative or answer at step S8 is given affirmative. Thus, the central processing unit 2 activates the active call-up device 13 at intervals of 60 minutes until the lapse of time reaches 24 hours.

If the user has not come back to the portable communication terminal, yet, the lapse of time exceeds 24 hours. Then, the answers at steps S12, S14 and S16 are given negative, and the central processing unit 2 sets the timer to 6 hours as by step S18. The central processing unit 2 reiterates the loop consisting of steps S2, S3, S12, S14, S16, S18 and S6 to S9 until the answer at step S3 is given negative or answer at step S8 is given affirmative. Thus, the central processing unit 2 activates the active call-up device 13 at intervals of 6 hours until the user returns to the portable communication terminal. As will be understood from the foregoing description, the portable communication terminal implementing the second embodiment activates the active call-up device 13 at irregular time intervals, which are increased with time, so that the active call-up device forces the user to pay the attention to the message on the display 5 immediately after returning to the portable communication terminal without repetition of ineffective excitative indication.

Although a particular embodiment of the present invention has been shown and described, it will be apparent to those skilled in the art that various changes and modifications may be made without departing from the spirit and scope of the present invention.

For example, another active call-up device may have two of the vibrator 8, in-coming indicator 9 and speaker 10. Of course, only one of the vibrator 8, in-coming indicator 9 and speaker 10 may serve as the active call-up device.

The rumble, flickers and vibrations do not set any limit on "excitative indication". Any kind of output to the senses of human being are available for the active call-up device in so far as the output forces the user to pay the attention to the active call-up device.

The central processing unit 2 may change the intervals of the active call-up. If the absence is continued for a long time, the central processing unit 2 may prolongs the intervals so as to reduce the activation of the active call-up device 13.

The time intervals employed in the second embodiment do not set a limit on the present invention. The time intervals may be values different from those of the second embodiment. The user may change the time intervals through the manipulation panel 6.

What is claimed is:

1. A portable communication terminal forming a part of a communication network, comprising:

a transmitter-receiver receiving an in-coming signal and transmitting an out-going signal through a communication channel of said communication network;

an active call-up device responsive to a first instruction for producing an excitative indication, and giving said excitative indication to an environment so as to force a user, if any, to pay an attention thereto;

an interface to said user for at least accepting a response to said in-coming signal;

an information processing system connected to said transmitter-receiver, said active call-up device and said interface, and producing said first instruction when said communication channel is broken before said user gives said response through said interface.

2. The portable communication terminal as set forth in claim 1, in which said active call-up device includes a vibrator so that vibrations are generated as said excitative indication.

3. The portable communication terminal as set forth in claim 1, in which said active call-up device includes a light emitting device so that a flicker is generated as said excitative indication.

4. The portable communication terminal as set forth in claim 1, in which said active call-up device includes a speaker so that rumble is generated as said excitative indication.

5. The portable communication terminal as set forth in claim 1, in which said active call-up device includes two of a vibrator, a light emitting device and a speaker so that vibrations, flicker and rumble are selectively generated as said excitative indication.

6. The portable communication terminal as set forth in claim 5, in which said vibrator is changed between an enabled state and disabled state with a second instruction given by said user through said interface.

7. The portable communication terminal as set forth in claim 1, in which said active call-up device includes a vibrator, a light emitting device and a speaker so that vibrations, flicker and rumble are generated as said excitative indication.

8. The portable communication terminal as set forth in claim 7, in which said vibrator is changed between an enabled state and disabled state with a second instruction given by said user through said interface.

9. The portable communication terminal as set forth in claim 1, in which said active call-up device repeats said excitative indication at time intervals until said user inputs said response through said interface.

10. The portable communication terminal as set forth in claim 9, in which said time intervals are variable depending upon a lapse of time from the arrival of said in-coming signal.

11. The portable communication terminal as set forth in claim 9, in which said time intervals are prolonged together with a lapse of time from the arrival of said in-coming signal.

12. The portable communication terminal as set forth in claim 1, in which said interface has a display panel responsive to a second instruction given by said information processing system so as to produce a message notifying said user of said in-coming signal without said response on an image-forming plane thereof.

13. The portable communication terminal as set forth in claim 12, in which said message further notifies said user how many incoming signals said transmitter-receiver have received without said response.

14. The portable communication terminal as set forth in claim 1, in which said in-coming signal relates to at least one of a call and an e-mail.

15. The portable communication terminal as set forth in claim 14, in which said at least one of said call and said e-mail is transmitted through a radio channel from a base station.

16. The portable communication terminal as set forth in claim 15, in which said base station is connected to a server of at least one provider through an internet.

17. A method for outputting an excitative indication from a portable communication terminal, comprising the steps of:
   (a) receiving an in-coming signal relating at least one of a call and an e-mail;
   (b) determining whether or not a user has responded to said in-coming signal;
   (c) checking a lapse of time from the reception of said in-coming signal to see whether or not said lapse of time reaches a value when the answer at step (b) is given negative;
   (d) generating said excitative indication so as to force said user, if any, to pay an attention to said at least one of said call and said e-mail when the answer at step (c) is given affirmative; and
   (e) repeating said steps (b), (c) and (d) until the answer at step (b) is changed affirmative.

18. The method as set forth in claim 17, in which said lapse of time is stepwise prolonged with time.

19. The method as set forth in claim 17, in which said excitative indication is at least one of vibrations, flicker of light and rumble.

20. A computer program for realizing a method of outputting an excitative indication from a portable communication terminal, said method comprising the steps of:
   (a) receiving an in-coming signal relating at least one of a call and an e-mail;
   (b) determining whether or not a user has responded to said in-coming signal;
   (c) checking a lapse of time from the reception of said in-coming signal to see whether or not said lapse of time reaches a value when the answer at step (b) is given negative;
   (d) generating said excitative indication so as to force said user, if any, to pay an attention to said at least one of said call and said e-mail when the answer at step (c) is given affirmative; and
   (e) repeating said steps (b), (c) and (d) until the answer at step (b) is changed affirmative.

21. The method as set forth in claim 20, in which said lapse of time is stepwise prolonged with time.

22. The method as set forth in claim 20, in which said excitative indication is at least one of vibrations, flicker of light and rumble.

* * * * *